United States Patent Office 3,475,472
Patented Oct. 28, 1969

3,475,472
METHOD FOR PREPARING TRIORGANO-TIN HALIDES AND BIS(TRIORGANOTIN) OXIDES
Reiichi Suzuki, Nishinomiya-shi, Yutaka Shioyama, Suita-shi, and Tadashi Takubo, Amagasaki-shi, Japan, assignors to Nitto Kasei Co., Ltd., Osaka, Japan, a corporation of Japan
No Drawing. Filed Sept. 21, 1967, Ser. No. 669,375
Int. Cl. C07f 7/22
U.S. Cl. 260—429.7         3 Claims

ABSTRACT OF THE DISCLOSURE

This invention relates to a process of preparing tri-substituted organotin halides having the general formula $$R_aR'_bSnX$$

wherein R and R' are each selected from the group consisting of alkyl, cycloalkyl, and aryl, X is a halogen, each of $a$ and $b$ is an integer 1–2, and the total of $a$ and $b$ is 3, which comprises reacting in the presence of dimethylformamide an organotin halide of the general formula $$R_aSnX_{4-a}$$

wherein R, X, and $a$ have the meanings given above, a compound of the general formula $$R'X$$

wherein R' and X have the meanings given above, and zinc.

---

This invention relates to a process of preparing tri-substituted organotin halides.

The demand for trialkyltin and triaryltin compounds has been increasing due to their use as the active ingredient in bactericides, insecticides, fungicides, agricultural chemicals, antifouling paints, etc. Organotin compounds of the $R_3SnX$ type have been manufactured in accordance with prior art practices, by the disproportionation reaction of $R_4Sn$ (produced from RMgX and $SnX_4$) with $SnX_4$. In the Grignard reaction large quantity of ether solvent has been used and this has generated a considerable fire hazard; and such expensive raw materials as stannic chloride and magnesium have been used. On the other hand, the manufacture of $R_3SnI$ by the reaction of $R_2SnI_2$ with RI in the presence of zinc takes as much time as 10 to 20 hours; in addition the product is a mixture of $R_4Sn$, $R_3SnI$, and $R_2SnI_2$—and the yield of $R_3SnI$ is low. Such methods appear not to be useful for industrial scale production.

It is an object of this invention to provide a considerably simplified process of preparing tri-substituted organotin halides having the general formula $$R_aR'_bSnX$$

wherein R and R' are each selected from the group consisting of alkyl, cycloalkyl, and aryl, X is a halogen, each of $a$ and $b$ is an integer 1–2, and the total of $a$ and $b$ is 3.

In accordance with certain of its aspects, this invention relates to the process of preparing tri-substituted organotin halides having the general formula $$R_aR'_bSnX$$

wherein R and R' are each selected from the group consisting of alkyl, cycloalkyl, and aryl, X is a halogen, each of $a$ and $b$ is an integer 1–2, and the total of $a$ and $b$ is 3, which comprises reacting in the presence of dimethylformamide an organotin halide of the general formula $$R_aSnX_{4-a}$$

wherein R, X, and $a$ have the meanings given above, a compound of the general formula $$R'X$$

wherein R' and X have the meanings given above, and zinc.

The process of this invention is completed at a lowered temperature in remarkably reduced time—usually two hours, and the product is obtained in a high yield. In addition, the distinction of the reaction is that assymmetrically substituted triorganotin compounds are most easily obtained although, in accordance with prior art, it seemed difficult to obtain these compounds on an industrial scale.

The reaction of this invention in combination with the direct reaction of alkyl halides with tin for manufacturing dialkyltin halide facilitates the preparation of $R_2R'SnX$ in a high yield by such a simplified process as represented by the following equation:

$$Sn \xrightarrow{2RX} R_2SnX_2 \xrightarrow[\text{Dimethylformamide}]{R'X,\ Zn} R_2R'SnX$$

In the compounds $R_aSnX_{4-a}$ and R'X, R and R' may be identical or different and each of R and R' may be an alkyl radical such as methyl, ethyl, propyl, butyl, amyl, octyl radical, or cycloalkyl radical such as cyclohexyl, or aryl radical such as phenyl, tolyl, p-chlorophenyl radical; and each X may be identical or different and is a halogen atom such as chlorine, bromine, or iodine atom.

In performing this invention, above mentioned raw materials and zinc may be heated and reacted in the presence of dimethylformamide. When R' in the compound R'X is lower alkyl, the reaction may easily proceed at a relatively low temperature; and it is a distinctive feature of this invention to be able to use aryl halides as the compound R'X. There are many forms of zinc used in this invention, among which powdered or ribbon type may be preferable.

According to this invention, not only the symmetric compound $R_3SnX$ but the asymmetric compound $$R_2R'SnX$$

may be produced readily on an industrial scale and the new use of compound $R_2R'SnX$ is expected. The product compound $R_aR'_bSnX$ is obtained in high purity, and directed to various applications after only simple treatment with hydrochloric acid. If desired it can be hydrolyzed to the corresponding oxide.

EXAMPLE 1

In a 1 liter three-necked flask equipped with a stirrer, reflux condenser and thermometer, 244 g. of dibutyltin diiodide, 78 g. of methyl iodide, and 33 g. of powdered zinc each were placed and the mixture stirred at 100°–120° C. for 6 hours. In this stage, the mixture was hardly reacted.

When 20 g. of dimethylformamide was added to the mixture, the reaction proceeded in an exothermic manner. The reaction mixture was stirred at 60°–100° C. until zinc nearly vanished (for 2 hours). After the reaction, 200 ml. of 8% hydrochloric acid was added to dissolve unreacted zinc, zinc iodide, and dimethylformamide. After settling, the hydrochloric acid was removed and the product layer was distilled at 98°–99° C. and 1.0 mm. Hg. Dibutyl methyltin iodide was recovered in an amount of 177 g. (94.5%).

EXAMPLE 2

In a 1 liter three-necked flask equipped with a stirrer, reflux condenser and thermometer, 27.8 g. of butyltin triiodide, 220 g. of dibutyltin diiodide, 110 g. of butyl iodide, 36 g. of powdered zinc, and 30 g. of dimethylformamide were placed and heated to 100°–120° C. for 2 hours. The same procedure as in Example 1 was followed, and the resultant tributyltin iodide was treated with caustic soda solution to obtain 135 g. (91.0%) of bis-tributyltin oxide and 5 g. of dibutyltin oxide. The purity of bis-tributyltin oxide was 96%.

EXAMPLE 3

In the same flask as used in Example 1, 138 g. of dipropyltin dichloride, 109 g. of amyl iodide, 33 g. of zinc, and 40 g. of dimethylformamide were placed and reacted for 2 hours at 120°–130° C. After the treatment with hydrochloric acid. the product layer was hydrolyzed with caustic soda solution to obtain 126 g. (87%) of bis(dipropyl amyltin) oxide.

EXAMPLE 4

A mixture of 264 g. of diphenyltin diiodide, 61.0 g. of ethyl bromide, and 33 g. of zinc was reacted in the presence of 30 g. of dimethylformamide for 3 hours at 70°–110° C. After the reaction, the reaction mixture was treated with dilute hydrochloric acid to obtain 174 g. (81.3%) of dephenyl ethyltin iodide.

EXAMPLE 5

A mixture of 201 g. of dimethyltin diiodide, 115 g. of cyclohexyl iodide, 33 g. of zinc, and 30 g. of dimethylformamide was reacted for 3 hours at 100°–120° C. After the reaction, the reaction mixture was treated with hydrochloric acid and the obtained crude dimethyl cyclohexyltin iodide was distilled at 93°–94° C. and 1.0 mm. Hg to obtain 143 g. (82.0%) of product.

EXAMPLE 6

A mixture of 172 g. of diphenyltin dichloride, 112 g. of phenyl iodide, 42.5 g. of zinc, and 200 g. of dimethylformamide was reacted for 4 hours at 120°–130° C. After the reaction, the reaction mixture was treated with 600 ml. of 8% hydrochloric acid and the crystalline substance which precipitated was filtered. The filtrate was then dissolved in toluene and the solution was hydrolyzed with an alkali to obtain 141 g. (77%) of triphenyltin hydroxide. The melting point was 119°–121° C.

We claim:
1. A process of preparing tri-substituted organotin halides having the general formula

$$R_aR'_bSnX$$

wherein R and R' are each selected from the group consisting of alkyl, cycloalkyl, and aryl, X is a halogen, each of $a$ and $b$ is an integer 1–2, and the total of $a$ and $b$ is 3, which comprises reacting in the presence of dimethylformamide an organotin halide of the general formula $$R_aSnX_{4-a}$$

wherein R, X, and $a$ have the meanings given above, a compound of the general formula $$R'X$$

wherein R' and X have the meanings given above, and zinc.

2. A process as claimed in claim 1 wherein R is selected from the group consisting of methyl, propyl, butyl, and phenyl, R' is selected from the group consisting of methyl, ethyl, butyl, amyl, cyclohexyl, and phenyl, and X is selected from the group consisting of iodine, bromine, and chlorine.

3. A process of preparing bis-tributyltin oxide which comprises reacting butyltin triiodide, dibutyltin diiodide, butyl iodide, and zinc in the presence of dimethylformamide to produce tributyltin iodide and then hydrolyzing said tributyltin iodide with a base to produce bis-tributyltin oxide.

References Cited

UNITED STATES PATENTS

| | | | |
|---|---|---|---|
| 3,082,230 | 3/1963 | Dorfelt et al. | 260—429.7 |
| 3,080,408 | 3/1962 | Andreas et el. | 260—429.7 |
| 3,085,102 | 4/1963 | Yatagai et al. | 260—429.7 |
| 3,100,215 | 8/1963 | Gelbert | 260—429.7 |
| 3,198,819 | 8/1965 | Gloskey | 260—428.7 |
| 3,251,871 | 5/1966 | Dorfelt | 260—429.7 |
| 3,287,386 | 11/1966 | Neuman | 260—429.7 |
| 3,387,011 | 6/1968 | Coates et al. | 260—429.7 |
| 3,387,012 | 6/1968 | Jasching et al. | 260—429.7 |
| 3,340,283 | 9/1967 | Gloskey | 260—429.7 |
| 3,414,595 | 12/1968 | Oakes | 260—429.7 |

TOBIAS E. LEVOW, Primary Examiner

W. F. W. BELLAMY, Assistant Examiner